United States Patent
Gage et al.

(10) Patent No.: US 7,281,265 B1
(45) Date of Patent: Oct. 9, 2007

(54) SYSTEM AND METHOD FOR COMMUNICATING PACKETS IN A NETWORK ENVIRONMENT

(75) Inventors: Timothy M. Gage, Durham, NC (US); Alvaro E. Retana, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 872 days.

(21) Appl. No.: 10/453,360

(22) Filed: Jun. 2, 2003

(51) Int. Cl.
  *G06F 7/04* (2006.01)
  *H04L 9/00* (2006.01)
(52) U.S. Cl. .................................. 726/13; 713/154
(58) Field of Classification Search ............. 726/13; 713/154
  See application file for complete search history.

(56) References Cited

U.S. PATENT DOCUMENTS

| | | | |
|---|---|---|---|
| 5,511,122 A | 4/1996 | Atkinson | 380/25 |
| 5,937,159 A | 8/1999 | Meyers et al. | 395/187.01 |
| 6,061,798 A | 5/2000 | Coley et al. | 713/201 |
| 6,304,973 B1 | 10/2001 | Williams | 713/201 |
| 6,321,336 B1 | 11/2001 | Applegate et al. | 713/201 |
| 6,452,915 B1 | 9/2002 | Jorgensen | 370/338 |
| 6,550,012 B1 | 4/2003 | Villa et al. | 713/201 |

*Primary Examiner*—David Y. Jung
*Assistant Examiner*—Peter Poltorak
(74) *Attorney, Agent, or Firm*—Baker Botts L.L.P.

(57) ABSTRACT

A method for communicating packets in a network environment is provided that includes receiving a first and a second packet and determining if the second packet is substantially similar to the first packet. If the second packet is received during a predetermined time interval, then the first packet may be communicated to a next destination.

25 Claims, 2 Drawing Sheets

SYSTEM AND METHOD FOR COMMUNICATING PACKETS IN A NETWORK ENVIRONMENT

TECHNICAL FIELD OF THE INVENTION

This invention relates in general to the field of communications and more particularly to a system and method for communicating packets in a network environment.

BACKGROUND OF THE INVENTION

Networking architectures have grown increasingly complex in communication environments. In addition, the augmentation of clients or end users wishing to communicate in a network has caused many networking configurations and systems to become susceptible to elements that seek to misrepresent identities or corrupt network traffic. In general, communication tunnels or links may be used in order to establish or to gain access to a network, whereby an end user or an object may initiate some protocol by invoking a selected location or a network node. As the subscriber base of end-users increases, proper routing of communication tunnels or links and efficient management of data flows becomes even more critical.

As a packet traverses the network through a given communication tunnel, there is generally no record kept of its path. Accordingly, the origination point of the packet may be somewhat ambiguous, as there is no way of determining that the packet was communicated from an address (e.g. as specified by a header). This may create a security concern or an integrity issue because packet spoofing may be occurring in the network. In general, packet spoofing may involve a scenario in which the source address of a packet is replaced with a value, which is not the true source of the packet. Such a procedure may be used, for example, by a hacker in attempting to break into a communication session or to attack a given network device. Hackers may also use other strategies or techniques in order to pierce network security, corrupt network communications, infiltrate network participants, or compromise the integrity of network traffic.

SUMMARY OF THE INVENTION

From the foregoing, it may be appreciated by those skilled in the art that a need has arisen for an improved communications approach that provides for increased authenticity and/or enhanced integrity in packet communications in a network environment. In accordance with one embodiment of the present invention, a system and method for communicating packets in a network environment are provided that greatly reduce disadvantages and problems associated with conventional packet communication techniques.

According to one embodiment of the present invention, there is provided a method for communicating packets in a network environment that includes receiving a first and a second packet and determining if the second packet is substantially similar to the first packet. If the second packet is received during a predetermined time interval, then the first packet may be communicated to a next destination.

Certain embodiments of the present invention may provide a number of technical advantages. For example, according to one embodiment of the present invention, a communications approach is provided that allows for more secure communications between two points or network nodes. This is a result of a redundant packet, which may also be referred to as a confirmation packet, that may be exchanged between two network elements. The use of a redundant packet implies, to a receiving node, that a proper communication is being effectuated. Accordingly, if a receiving node receives a redundant packet within a given time interval, which is user-configurable, the receiving node is assured that the proffered identity of the communicating network element is valid and/or accurate.

Another technical advantage associated with one embodiment of the present invention is a result of filtering elements that may be used in conjunction with network elements. The filtering elements may perform front-end operations for the corresponding network element such that erroneous packets do not reach the intended destination of a receiving network element. This further simplifies communications between two network elements and reduces time-intensive operations associated with determining which packets are valid and which should be discarded. Thus, a filtering element can readily discard packets before an extensive examination of the packets is conducted by a receiving network element. As certain network designers and system operators may appreciate, this provides an approach that conserves network resources because problematic communications are being identified more quickly and without further burdening corresponding network elements. Moreover, the protocol for identifying and discarding erroneous packets may be executed quickly and easily without inhibiting existing network operations or other communication sessions being conducted. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
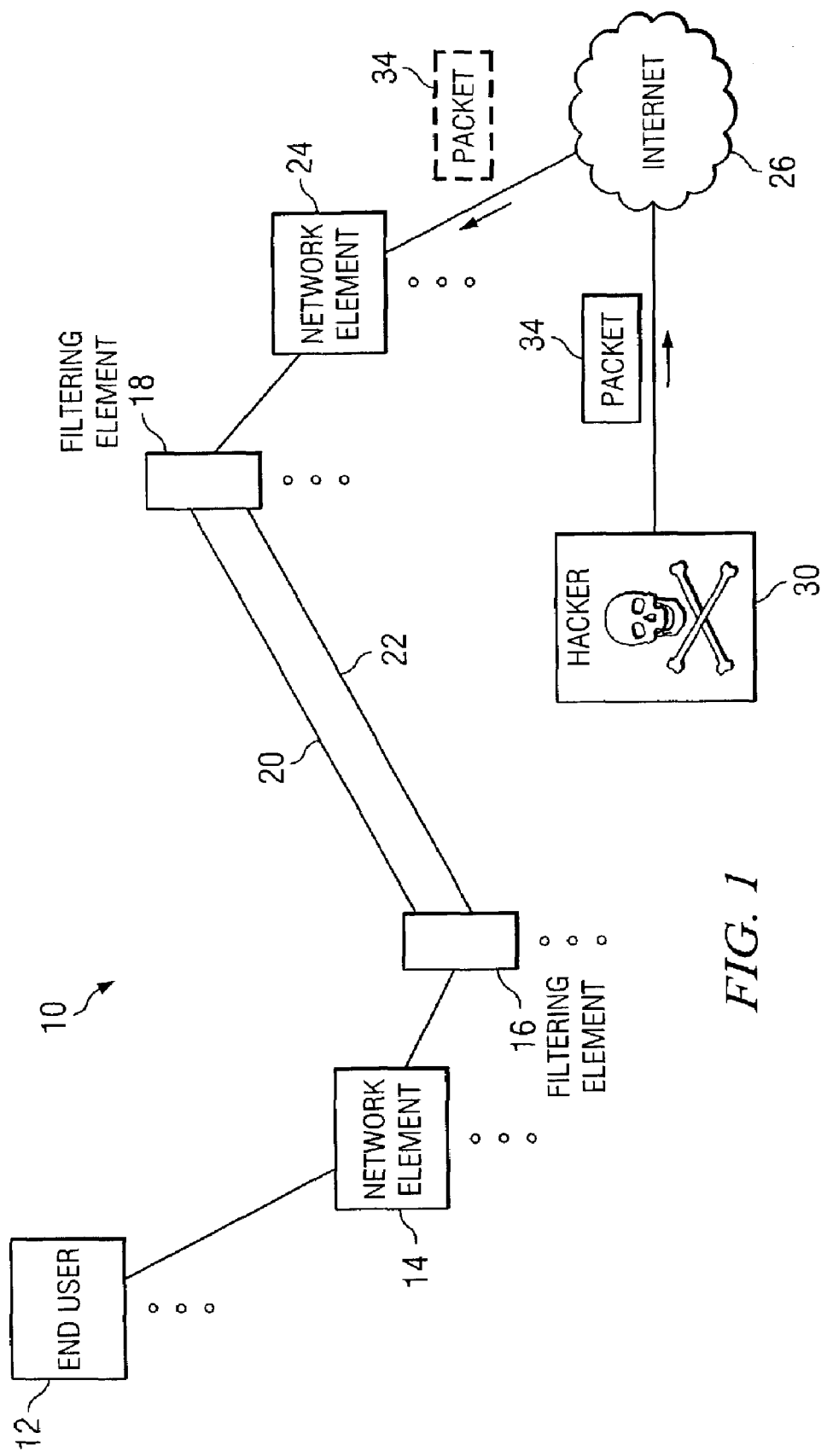
FIG. 1 is a simplified block diagram of a communication system for communicating packets in a network environment in accordance with one embodiment of the present invention.

FIG. 1 is a simplified block diagram of a communication system 10 for communicating data or information in a network environment. Communication system 10 may include an end user 12, multiple network elements 14 and 24, multiple filtering elements 16 and 18, and an Internet 26. Filtering elements 16 and 18 may be coupled to each other via a set of communication links 20 and 22. In addition, communication system 10 may include a hacker 30 who may be attempting to send an erroneous packet 34 (or misrepresent the origin of packet 34) through Internet 26 and to network element 14. FIG. 1 may be generally configured or arranged to represent any communication architecture capable of exchanging packets in a network environment. In addition, communication system 10 may include any suitable networking protocol or arrangement that provides a communicative platform for communication system 10. Such architectures may include, for example, first generation, 2G, and 3G architectures that provide packet-exchanging capabilities. Communication system 10 may include a configuration capable of transmission control protocol/Internet protocol (TCP/IP) communications for the transmission or reception of packets in a network.

In accordance with the teachings of the present invention, communication system 10 provides a communications approach that protects network elements 14 and 24 (from destructive traffic or corruptive elements) by identifying spoofed packets through a process of packet mirroring across redundant communication links 20 and 22. When a given network element, e.g. network element 14 or network element 24, communicates a packet to its neighbor (e.g. via a border gateway protocol (BGP) or an open shortest path first (OSPF) update), it may also immediately communicate a copy of that packet over a corresponding redundant link. The neighboring (or receiving) network element may then only accept a packet, which is destined for its local address, that is received twice within a designated time interval (which may be user-configurable) on a selected one of the redundant communication links 20 and 22. In cases where only a single copy of the communicated packet is received within a designated window of time, the packet may be declared invalid and accordingly discarded.

The behavior of hacker 30 may create a security concern or an integrity issue because of the packet spoofing that may be occurring in the network. Packet spoofing may involve a scenario in which the source address of a packet is replaced with a value, which is not the true source of the packet. Such a procedure may be used by hacker 30 in attempting to break into a communication session or attack a given network element 14 or 24. Hacker 30 may also use other strategies or techniques in order to pierce network security, corrupt network communications, infiltrate network participants, or compromise the integrity of network traffic.

Accordingly, it is important to prevent hacker 30 from executing any of these destructive operations. Communication system 10 may capitalize on the inability of hacker 30 to execute operations that are capable of being performed by network elements 14 and 24. Hacker 30 may communicate a packet with a source equal to X, whereby network element 24 is faced with a decision because the source of X has not been changed or modified after traversing Internet 26.

Hacker 30 may generally create chaos if he can get a packet of information to network element 14 and have network element 14 think that it is network element 24 (or some other network element) communicating this packet. Hacker 30 may disrupt routing protocols, interrupt communications between network elements 14 and 24, break communications between network elements 14 and 24, execute a denial of service attack (whereby communications between network elements 14 and 24 are broken by overloading communication links between network elements 14 and 24 such that additional communications are not allowed), imitate network element 24 such that network element 14 disconnects network element 24 or causes the information that network element 14 supposedly receives from network element 24 to be faulty, or execute any number of other harmful or damaging actions.

In the event of a link failure, which leaves only a single link between neighboring network elements 14 and 24, these elements may realize that only a single communications link exists and revert to a given default behavior in certifying packet exchanges. Such a protocol change may effectively prevent incorrectly discarding/dropping packets of information that are valid in communication system 10.

Network elements 14 and 24 may generally forward a hacker's packet along the path defined in a given routing table. Given no load sharing or a load-sharing protocol partially or exclusively based on the source address of a packet, communication system 10 makes it impossible for hacker 30 to communicate packets to any destination over any one of two different local links. Given the propagation delay of packets via Internet 26, as compared to the propagation delays of packets over directly connected links, it is unlikely that hacker 30 could communicate two simultaneous packets that appear to be mirrored from the perspective of a receiving device. Because of these precise parameters, communication system 10 may provide a communication approach that uses a sensitive time element in order to validate packet communications. The validation of such packets may be used to protect network elements 14 and 24 (e.g. locally connected, or single hop routing protocols) from spoofed packet attacks initiated by any entity seeking to corrupt network communications. Communication system 10 may also be extended to provide an operation in which protection exists on a hop-by-hop basis to protect an entire data path.

Communications system 10 may allow for more secure communications between two points or network nodes. This is a result of the redundant packet, which may also be referred to herein in this document as a 'confirmation packet' that may be exchanged between two network elements. The use of a redundant packet implies, to a receiving node, that a proper communication is being effectuated. Accordingly, if a receiving node receives a redundant packet within a given time interval, which is user-configurable, the receiving node is assured that the proffered identity of the communicating network element is valid and/or accurate.

Communication system 10 may also provide a simplistic detection approach that can identify bogus packets by simply looking for a lack of a duplicate packet header. This may result in central processing unit (CPU) intensive operations being eliminated. Such intensive operations may include secure hash algorithm (SHA) procedures, or message digest five (MD5) tasks that are generally not necessary to identify spoofed packets in the network. This may also result in considerable savings in not having to implement such procedures in order to ensure valid packets are propagating through a corresponding network.

End user 12 is a client or a customer wishing to initiate a communication in communication system 10, for example to make contact with Internet 26. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or any other suitable terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Network elements 14 and 24 are network devices that may exchange data or information via one or more packets. In a particular embodiment of the present invention, network elements 14 and 24 are routers. Alternatively, network elements 14 and 24 may be load balancers, switches, processors, bridges, gateways, or any other network device, element, component, or object capable of facilitating a data or an information exchange in a network environment. Network elements 14 and 24 may include any suitable routing tables, software, hardware, algorithms, or elements that may be used to effectuate their operations. Network element 14 may also represent an element owned by a corporation; for example, network element 24 may be an element owned by an Internet service provider (ISP).

In addition, each of network elements 14 and 24 may include appropriate hardware or software that operates to store an identification element associated with a first packet received via a corresponding communication link. For example, each of network elements 14 and 24 may simply store a fingerprint or a check-sum associated with the packet, or any other suitable object that reflects an identity associated with the received packet. After a given network element 14 or 24 receives a confirmation packet, the original packet being held may then be forwarded along an appropriate path, or processed in accordance with particular needs. Thus, network elements 14 and 24 do not necessarily have to store a whole packet (or an entire packet string) while waiting for a second redundant packet (or redundant packet sting) to be received. This operation may conserve resources and, where appropriate, be implementation-specific in accordance with particular needs. In other embodiments, network elements 14 and 24 may be any object that is layer-three capable. Network elements 14 and 24 may be applicable to anything that includes an address and that can be spoofed. In general, a layer-three address is not modified as it traverses the network and, thus, such an element is susceptible to hacker attacks and thereby benefit from the teachings of the present invention.

For purposes of teaching, it is helpful to explain the general concept of "traffic." This explanation has been offered for purposes of example only and, accordingly, should not be construed to limit the broad scope of the subject matter included herein. There are generally two classes of traffic: traffic generated by network element 24 and traffic that is forwarded by network element 24. Elements or data that are generated by network element 24 may be properly replicated. Accordingly, if hacker 30 communicates a packet, which is forwarded, it will not be replicated. Such data or information may be appropriately discarded by network element 14. Network element 24 may be aware that its locally generated traffic is being duplicated or replicated. It may also be aware that information that is bound to be forwarded is to be discarded or ignored. A secured protocol, having any number of permutations and potential forms, may be provided between network element 24 and filtering element 18, or, alternatively, between network element 14 and filtering element 16 (or both).

Network elements 14 and 24 may include a packet criteria such that packets that match the criteria are communicated to an appropriate filtering element. The appropriate filtering element (or network elements 14 and 24 in other embodiments) may then replicate or duplicate the packet and communicate it along a corresponding communication link. This allows two substantially similar packets to propagate via communication links 20 and 22. The criteria may be provided in software or hardware, or alternatively provided at any other suitable device, component, object, algorithm, or element that offers a criteria for packet matching.

Filtering elements 16 and 18 are network devices that are used to execute front-end operations for their corresponding network elements 14 and 24 respectively. Filtering elements 16 and 18 may be coupled to their respective network element 14 and 24 via a single communication link, whereby filtering elements 16 and 18 are coupled to each other via two or more communication links 20 and 22. Communication links 20 and 22 allow the redundant packets to be communicated in communication system 10 in an effort to thwart the deceptive acts of hacker 30. In alternative scenarios, these elements may be coupled in any suitable fashion such that a data exchange is facilitated.

Filtering elements 16 and 18 may include a signaling protocol that operates to identify valid incoming packets based on the identification of a redundant packet being communicated over a second communication link. Filtering elements 16 and 18 may include any suitable hardware, software, routing table, algorithm, element, or object that is operable to effectuate their operations in identifying erroneous packets, discarding erroneous packets, or signaling the authenticity of valid packets to be communicated through to a corresponding network element 14 or 24. Moreover, filtering elements 16 and 18 may be provided with a matching criteria (in hardware or software) such that any packet that matches the matching criteria designated may either be duplicated and communicated along a redundant path or, alternatively, ignored or discarded. Alternatively, this functionality may be provided in any other suitable component or device, or provided within network elements 14 and 24.

In one embodiment of the present invention, filtering elements 16 and 18 may be provided within a corresponding network element 14 and 24. Communication system 10 offers considerable flexibility in that filtering elements 16 and 18 may be provided in any suitable location in order to perform their operations. In cases where filtering elements 16 and 18 are provided within network elements 14 and 24, network elements 14 and 24 may be arranged in any suitable manner such that redundant packets are properly identified and may be declared to be valid in a network environment. In other embodiments, filtering elements 16 and 18 may be provided external to network elements 14 and 24 as separate elements, components, or modules capable of interfacing with corresponding network elements 14 and 24.

Filtering elements 16 and 18 may include suitable software that may provide an appropriate timing algorithm. The timing algorithm may provide a time interval in which a redundant package should be received by a corresponding network element 14 or 24. In cases where the appropriate confirmation packet is not received, the initial packet received may be appropriately ignored or discarded. Alternatively, this functionality may be provided in hardware, or any other suitable device, component, object, or element in accordance with particular needs.

In operation of an example embodiment, filtering elements 16 and 18 may be used to perform front-end operations for a corresponding network element such that erroneous packets do not reach the intended destination of a receiving network element. This further simplifies communications between two network elements and reduces time-intensive operations associated with determining which packets are valid and which should be discarded. Thus, a selected filtering element 16 or 18 can readily discard packets before an extensive examination of the packets is conducted by a receiving network element. As certain network designers and system operators may appreciate, this conserves network resources because problematic communications are being identified more quickly and without further burdening corresponding network elements. Moreover, the protocol for identifying and discarding erroneous packets may be executed quickly and easily without inhibiting network operations or other communication sessions being conducted.

A localized protocol that may be included within filtering elements 16 and 18 may be initiated in order to achieve enhanced communications between network element 14 and network element 24. The localized protocol may execute a replication whereby one packet is communicated and a second packet is expected to be received by a receiving element (i.e. network element 14). Network element 24 may forward what it receives from Internet 26 and network element 14 can recognize cases where no duplicate is provided. Because the absence of a duplicate departs from the established localized protocol, network element 14 can recognize this erroneous behavior and accordingly delete or ignore packet 34.

In failover scenarios there may be multiple redundant links for communications between network element 14 and network element 24. In such a case when a communication link fails, network elements 14 and 24 may continue their operations in accordance with the localized protocol. However, in cases where only two communication links exist and one becomes dysfunctional, network element 14 and network element 24 may recognize that there is only one link provided and adjust their behavior accordingly such that valid packets are not discarded.

In general, network element 14 may expect to receive a given packet during a certain time interval after receiving the first packet (which reflects a copy of the packet). This time interval may be user-selected or user-configured based on particular needs. In cases where network element 14 does not see the confirmation or redundant packet, network element 14 may have other options in dealing with the erroneous packet. For example, network element 14 may attempt to decipher the location of hacker 30 or forward an erroneous packet to a given entity in order to investigate the occurrence of improper behavior. In other scenarios, network element 14 may simply discard or ignore the packet such that it is never processed and, further, the packet does not waste valuable network resources. In cases where the packet is followed by a proper redundant packet, network element 14 may process or route the information through communication system 10 in any acceptable manner. It is important to note that the operation of replicating packets may be performed by either filtering elements 16 and 18 or executed internally by network elements 14 and 24 or executed by any other element operable to do so.

In operation of another example embodiment, which is provided for purposes of teaching only, normal operations may be occurring such that network element 24 receives packet 34 from Internet 26. Network element 24 may choose the best path to get to an address corresponding to network element 14. Without communication system 10, such a designation would either be communication link 20 or communication link 22, but generally not both. Network element 24 may then forward the packet over the best or selected communication link to network element 14. Hacker 30 would be precluded from ever sending a simultaneous packet over both communication links 20 and 22 to network element 14. However, network element 24 has the ability to communicate a duplicate packet over both communication links 20 and 22 such that its communications can be readily distinguished from that of hacker 30. In this manner, valid packets may propagate freely to their intended destination while corruptive packets (or packets that misrepresent their origin) may be ignored or deleted.

Internet 26 represents a series of points or nodes of interconnected communication paths for receiving and transmitting packets of information that propagate through communication system 10. Internet 26 offers a communicative interface between end user 12 and any other network location. Internet 26 may be replaced with an Intranet or any other suitable element that facilitates a data exchange in a network environment or that is implicated by communications involving end user 12. Internet 26 may be coupled to end user 12 via any local area network (LAN), wireless local area network (WLAN), metropolitan area network (MAN), wide area network (WAN), virtual private network (VPN), or any other appropriate architecture or system that facilitates communications in a network environment. These elements may implement a user datagram protocol (UDP)/Internet protocol (UDP/IP) communication language protocol in a particular embodiment of the present invention. However, these elements may alternatively implement any other suitable communication protocol for transmitting and receiving data or information within communication system 10.

Hacker 30 represents an entity that seeks to disturb normal communications in communication system 10. Hacker 30 may communicate packets that proclaim to originate from somewhere other than where they actually originated. Such a procedure is generally referred to as spoofing and may be used by hacker 30 in order to wreak havoc in a network environment. Hacker 30 may be any element, device, component, or object that seeks to misrepresent the accurate source of packet 34. Additionally, hacker 30 may be representative of any protocol, process, operation, virus, worm, Trojan, or element that seeks to imitate an entity or to confuse an entity in the context of network communications. Hacker 30 may also represent other elements, objects, or entities that seek to disrupt or disturb proper network communications in communication system 10. Hacker 30 may include any suitable algorithm, hardware, software, component, device, object, or element that effectuates its operations. In other scenarios, hacker 30 may be internal to network elements 14 or 24 or provided internally in an ISP's network, or in a corporate network for example.

Figure 2:
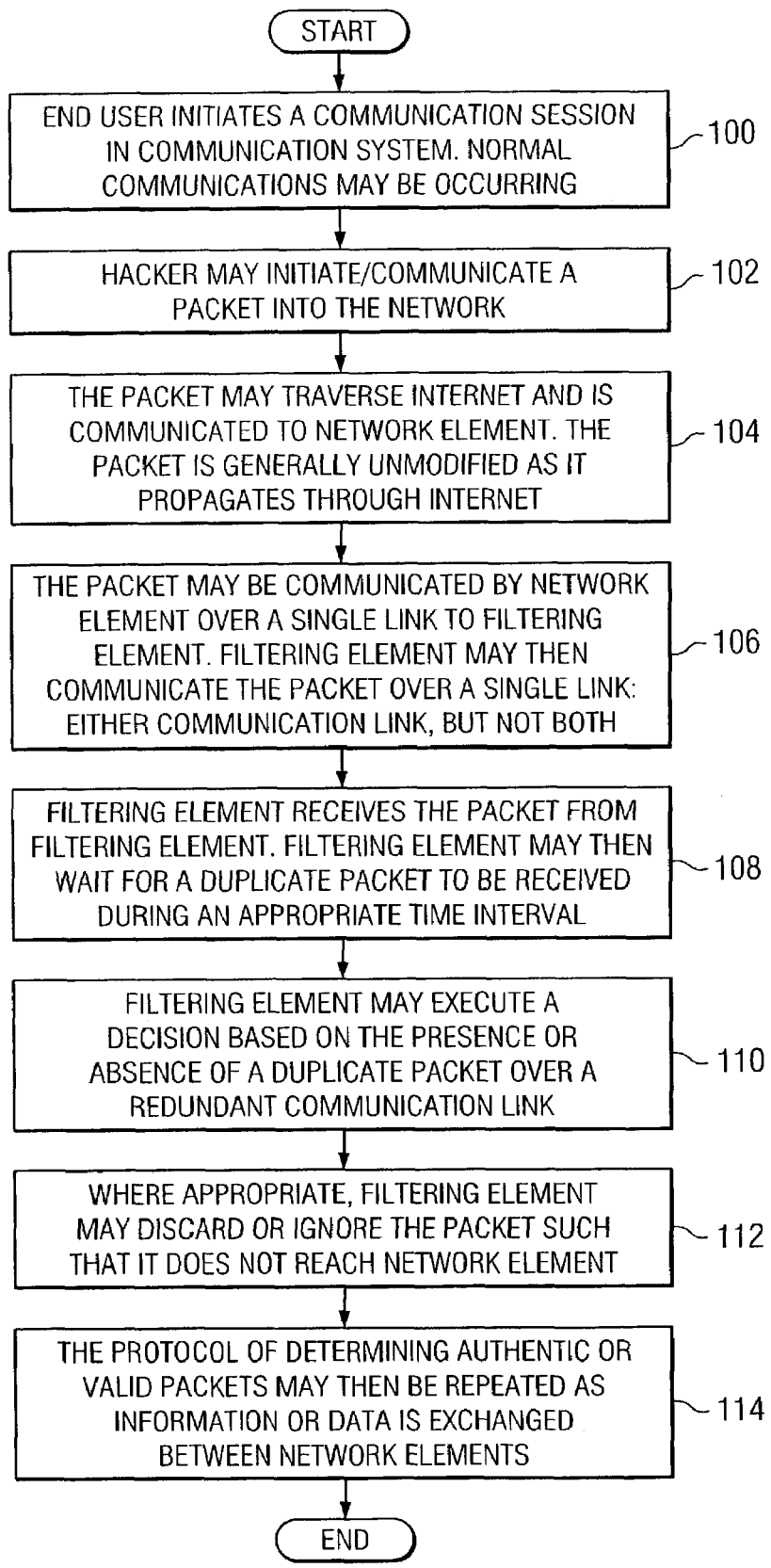
FIG. 2 is a flow chart illustrating a series of example steps associated with a method for communicating packets in a network environment.

FIG. 2 is a simplified flow chart illustrating a series of example steps associated with the method for communicating packets in a network environment. The method may begin at step 100 where end user 12 initiates a communication session in communication system 10. Network element 14 may be conducting normal operations between itself and network element 24 in performing data exchanges that involve end user 12. For example, network element 24 may be retrieving packets requested by end user 12 from Internet 26 and properly returning them to network element 14 such that end user 12 may be viewing web pages. At step 102, hacker 30 may initiate/communicate packet 34 into the network. At step 104, packet 34 may traverse Internet 26 and be received by network element 24. Packet 34 is generally unmodified as it propagates through Internet 26.

At step 106, packet 34 may be communicated by network element 24 over a single link to filtering element 18. Filtering element 18 may then communicate packet 34 over a single link: either communication link 20 or communication link 22 (but not both). In one embodiment, filtering element 16 receives packet 34 from filtering element 18. (Filtering element 16, in the example provided, is positioned external to network element 14.) At step 108, filtering element 16 may then wait for a duplicate packet to be received during an appropriate time interval. At step 110, filtering element 16 may execute a decision based on the presence or absence of a duplicate packet over a corresponding redundant communication link.

In cases where a duplicate packet is provided, filtering element 16 may communicate that valid packet to network element 14. In cases where filtering element 16 does not see an appropriate confirmation packet at step 112, filtering element 16 may discard or ignore packet 34 such that it does not reach network element 14. Accordingly, a localized protocol between filtering elements 16 and 18 (or alternatively provided to network elements 14 and 24) may be used to execute this replication whereby after a packet is received a next packet is expected. At step 114, this protocol of determining authentic or valid packets may then be repeated as information or data is exchanged between network elements 14 and 24.

Some of the steps illustrated in FIG. 2 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to particular arrangements and configurations, these example configurations and arrangements may be changed significantly without departing from the scope of the present invention. For example, although the present invention has been described with reference to a particular communication exchanges, communication system 10 is applicable to any routing protocol or routed protocol in which addresses may be manipulated in order to impersonate or otherwise confuse one or more end users in the network.

In addition, although communication system 10 has been illustrated with reference to particular elements that facilitate the communication process, these elements may be replaced by any suitable architecture or configuration that achieves the intended functionality of communication system 10. Certain elements may be used to identify invalid or erroneous packets propagating through the network, whereby other elements are relegated the task of discarding or ignoring that information. Additionally, tasks or operations may be provided and locations other than those illustrated in FIG. 1. The present invention anticipates considerable flexibility in the placement and positioning of network elements 14 and 24, as well as filtering elements 16 and 18. Moreover, filtering elements 16 and 18 may be provided in any suitable location, such as within network elements 14 and 24, or provided external thereto.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for communicating packets in a network environment, comprising:
  a network element operable to receive a first and a second packet, the network element being operable to determine if the second packet is substantially similar to the first packet and if the second packet is received during a predetermined time interval, wherein the network element is operable to communicate the first packet to a next destination in cases where the second packet is received by the network element during the predetermined time interval.

2. The apparatus of claim 1, wherein the network element is operable to discard the first packet if the second packet is not received by the network element during the predetermined time interval.

3. The apparatus of claim 1, further comprising:
  a filtering element included within the network element and operable to determine if the first and second packets are received during the predetermined time interval, wherein the filtering element is operable to discard the first packet if the second packet is not received during the predetermined time interval, and wherein the filtering element is operable to communicate a duplicate of a packet that is received to the next destination in cases where a subsequent matching packet is received during the predetermined time interval.

4. The apparatus of claim 1, wherein the network element is operable to store an identification element associated with the first packet such that if the second packet is received by the network element during the predetermined time interval, the network element may use the identification element to correlate the first packet to the second packet and then, if a match exists, communicate the first packet to the next destination.

5. The apparatus of claim 1, wherein the network element includes a localized communication protocol that allows the network element to interface with a neighboring network element for purposes of determining whether to communicate the first packet to a next destination or to discard the first packet.

6. The apparatus of claim 1, wherein the network element is operable to determine if a failover has occurred that is associated with a communication link that facilitates propagation of the first and second packets, the network element operable to regress to a default behavior in cases where only a single communication link is provided for receiving the first packet such that the first and second packets are not discarded.

7. The apparatus of claim 1, wherein the network element is operable to duplicate a received packet in order to communicate two packets, which are substantially similar to the received packet, via two communication links.

8. An apparatus for communicating packets in a network environment, comprising:
  a filtering element coupled to a network element and operable to receive a first and a second packet, the filtering element being operable to determine if the first and second packets are received during a predetermined time interval, wherein the filtering element is operable to discard the first packet if the second packet is not received during the predetermined time interval, and wherein the filtering element is operable to communicate a duplicate of a packet that is received to a next destination in cases where a subsequent matching packet is received during the predetermined time interval.

9. The apparatus of claim 8, wherein the filtering element includes a localized communication protocol that allows the filtering element to interface with a neighboring filtering element for purposes of determining whether to communicate the first packet to a next destination or to discard the first packet.

10. The apparatus of claim 8, wherein a selected one of the filtering element and the network element is operable to store an identification element associated with the first packet such that if the second packet is received during the predetermined time interval, the identification element may be used to correlate the first packet to the second packet before communicating the first packet to the next destination.

11. The apparatus of claim 8, wherein the filtering element is operable to determine if a failover has occurred that is associated with a communication link that facilitates propagation of the first and second packets, the filtering element operable to regress to a default behavior in cases where only a single communication link is provided for receiving the first packet such that the first and second packets are not discarded.

12. A method for communicating packets in a network environment, comprising:
receiving a first and a second packet;
determining if the second packet is substantially similar to the first packet and if the second packet is received during a predetermined time interval; and
communicating the first packet to a next destination in cases where the second packet is received during the predetermined time interval.

13. The method of claim 12, further comprising:
discarding the first packet if the second packet is not received during the predetermined time interval.

14. The method of claim 12, further comprising:
duplicating a received packet in order to communicate two packets, which are substantially similar to the received packet, via two communication links.

15. The method of claim 12, further comprising:
storing an identification element associated with the first packet such that if the second packet is received during the predetermined time interval, the identification element may be used to correlate the first packet to the second packet and then, if a match exists, communicate the first packet to the next destination.

16. The method of claim 12, further comprising:
determining if a failover has occurred that is associated with a communication link, which facilitates propagation of the first and second packets; and
regressing to a default behavior in cases where only a single communication link is provided for receiving the first packet such that the first and second packets are not discarded.

17. A system for communicating packets in a network environment, comprising:
means for receiving a first and a second packet;
means for determining if the second packet is substantially similar to the first packet and if the second packet is received during a predetermined time interval; and
means for communicating the first packet to a next destination in cases where the second packet is received during the predetermined time interval.

18. The system of claim 17, further comprising:
means for discarding the first packet if the second packet is not received during the predetermined time interval.

19. The system of claim 17, further comprising:
means for duplicating a received packet in order to communicate two packets, which are substantially similar to the received packet, via two communication links.

20. The system of claim 17, further comprising:
means for storing an identification element associated with the first packet such that if the second packet is received during the predetermined time interval, the identification element may be used to correlate the first packet to the second packet and then, if a match exists, communicate the first packet to the next destination.

21. The system of claim 17, further comprising:
means for determining if a failover has occurred that is associated with a communication link, which facilitates propagation of the first and second packets; and
means for regressing to a default behavior in cases where only a single communication link is provided for receiving the first packet such that the first and second packets are not discarded.

22. Software for communicating packets in a network environment, the software being embodied in a computer readable medium and comprising code such that when executed is operable to:
receive a first and a second packet;
determine if the second packet is substantially similar to the first packet and if the second packet is received during a predetermined time interval; and
communicate the first packet to a next destination in cases where the second packet is received during the predetermined time interval.

23. The medium of claim 22, wherein the code is further operable to:
discard the first packet if the second packet is not received during the predetermined time interval.

24. The medium of claim 22, wherein the code is further operable to:
duplicate a received packet in order to communicate two packets, which are substantially similar to the received packet, via two communication links.

25. The medium of claim 22, wherein the code is further operable to:
store an identification element associated with the first packet such that if the second packet is received during the predetermined time interval, the identification element may be used to correlate the first packet to the second packet and then, if a match exists, communicate the first packet to the next destination.

* * * * *